United States Patent
Pilar (10) Patent No.: US 11,530,495 B2
(45) Date of Patent: Dec. 20, 2022

(54) METHOD FOR REMOVING SLEEVES FROM A SLEEVE MAGAZINE, AND SLEEVE MAGAZINE

(71) Applicant: Maschinenfabrik Rieter AG, Winterthur (CH)

(72) Inventor: Evzen Pilar, Litomysl (CZ)

(73) Assignee: Maschinenfabrik Rieter AG, Winterthur (CH)

( * ) Notice: Subject to any disclaimer, the term of this patent is extended or adjusted under 35 U.S.C. 154(b) by 9 days.

(21) Appl. No.: 17/194,773

(22) Filed: Mar. 8, 2021

(65) Prior Publication Data

US 2021/0277542 A1    Sep. 9, 2021

(30) Foreign Application Priority Data

Mar. 9, 2020 (DE) ..................... 10 2020 106 324.5

(51) Int. Cl.
  *B65G 47/34* (2006.01)
  *B65G 15/30* (2006.01)
  *B65G 65/00* (2006.01)
  *D01H 9/08* (2006.01)

(52) U.S. Cl.
  CPC .............. *D01H 9/08* (2013.01); *B65G 47/34* (2013.01)

(58) Field of Classification Search
  None
  See application file for complete search history.

(56) References Cited

U.S. PATENT DOCUMENTS

| | | | | | |
|---|---|---|---|---|---|
| 4,641,740 | A | * | 2/1987 | Grecksch | B65H 67/068 198/801 |
| 5,350,128 | A | * | 9/1994 | Deters | B65H 67/064 242/473.6 |
| 5,456,563 | A | * | 10/1995 | Halbo | B65B 21/183 198/470.1 |
| 9,815,107 | B1 | * | 11/2017 | Hofsteede | B65G 47/44 |

FOREIGN PATENT DOCUMENTS

DE   10 2004 005 483 A1   9/2005
DE   10 2018 111 433 A1   11/2019

OTHER PUBLICATIONS

German Patent Office Seach Report, dated Oct. 12, 2020.

* cited by examiner

*Primary Examiner* — Kavel Singh
(74) *Attorney, Agent, or Firm* — Dority & Manning, P.A.

(57) ABSTRACT

A sleeve magazine for a textile machine and operational method include multiple transport elements each with a plurality of holders configured for holding a sleeve, wherein each transport element is driven to move the holders and sleeves to a removal point. A removal device at the removal point removes the sleeves from the holders. A controller controls movement of the individual transport elements such that the holder of at least one transport element is moved with the sleeve thereon to the removal point. The controller actuates the removal device to remove the sleeve from the holder at the removal point while the holders of the remaining transport elements are maintained outside of the removal point so as not to interfere with removal of the sleeve from the holder at the removal point.

16 Claims, 5 Drawing Sheets

METHOD FOR REMOVING SLEEVES FROM A SLEEVE MAGAZINE, AND SLEEVE MAGAZINE

FIELD OF THE INVENTION

The present invention relates to a method for removing individual sleeves from a sleeve magazine of a textile machine, wherein the sleeve magazine comprises a transport element including a plurality of holders, each of which can hold a sleeve, the transport element is driven, in order to move a holder to a removal point, and a removal device is arranged at the removal point, in order to take a sleeve from the holder, and an appropriate sleeve magazine.

BACKGROUND

DE 10 2018 111 433 A1 describes a textile machine, at which multiple sleeve magazines are arranged. Each sleeve magazine comprises a pulling means with sleeve holders, at which sleeves are arranged. A sleeve is removed from the sleeve magazine with a removal device. The removal device can be a pushing device, which pushes down the sleeve from a sleeve holder of the pulling means. It can be provided for only one single sleeve magazine or for multiple sleeve magazines simultaneously, with a displacement of the pulling means, if necessary, so that only one single sleeve is removed also in the case of a joint arrangement at multiple sleeve magazines. One type of sleeves can be stored in each sleeve magazine. In the case of multiple types of sleeves that can be utilized at the textile machine, multiple sleeve magazines are also necessary.

U.S. Pat. No. 4,641,740 describes a sleeve magazine, which comprises a chain as a pulling means, at which sleeves are arranged in the longitudinal direction as well as in the transverse direction. The sleeves are attached at the pulling means either in lines with one another or offset with respect to one another. A removal device always simultaneously removes all sleeves of a line. The removal of individual sleeves is therefore not possible.

A problem addressed by the present invention is that of being able to store multiple different types of sleeves in one sleeve magazine and to be able to remove these from the sleeve magazine individually or several thereof simultaneously, as necessary.

The problem is solved using a method and a sleeve magazine having the features set forth herein.

SUMMARY

Additional objects and advantages of the invention will be set forth in part in the following description, or may be obvious from the description, or may be learned through practice of the invention.

The method according to the invention is utilized for removing individual sleeves from a sleeve magazine of a textile machine. The sleeve magazine comprises a transport element with a plurality of holders, each of which can hold a sleeve. The transport element is driven, in order to move a holder with a sleeve to a removal point of the sleeve magazine. A removal device is arranged at the removal point, in order to remove the sleeve from the holder. According to the invention, multiple transport elements are arranged in the sleeve magazine. The sleeve magazine can be filled with sleeves in such a way that each transport element exclusively comprises one certain type of sleeves. Of course, multiple transport elements of the sleeve magazine can also accommodate identical types of sleeves, if this is necessary, or several different types of sleeves can be stored at one transport element.

By means of a controller according to the invention, the individual transport elements are controlled in such a way that at least one holder of at least one of the transport elements is moved with a sleeve to the removal point. The removal device is actuated for removing the sleeve from the holder for the case in which the holder of the at least one transport element is located, with its sleeve, at the removal point, while the holders of the other transport elements are located outside the removal point. Therefore, a predetermined number of holders with sleeves, preferably only one single holder, can be moved to the removal point.

The invention makes it possible for holders of the individual transport elements to be moved toward the removal point, according to demand, in such a way that the removal device at the removal point can find and remove the predetermined sleeves. It is therefore possible that the desired type of sleeve, which is located in one or more of the transport element(s), can be conveyed to the removal point and removed from the sleeve magazine in a targeted manner. The sleeve is then supplied to the textile machine, for example, of a winding station of a spinning machine, by an appropriate conveying means of the textile machine. Separate sleeve magazines for the individual types of sleeves are no longer necessary. The different types can be stored in one single sleeve magazine. Nevertheless, it is possible to access the necessary sleeve and supply it to the winding station.

It is particularly advantageous when the removal device can remove sleeves from multiple transport elements. Therefore, only one single removal device is necessary for multiple transport elements, preferably for all transport elements of the sleeve magazine, and for different types of sleeves. The sleeve magazine can therefore be operated cost-effectively and particularly efficiently.

It is advantageous when at least one predetermined transport element is activated in order to move a holder with a sleeve to the removal point of the removal device. The transport element is set into motion, for this purpose, by means of the controller and a motor for the transport element. As soon as an appropriate sleeve is located at the removal point, the movement of the transport element is stopped. The remaining transport elements of the sleeve magazine can remain idle. This type of control is possible when a separate motor is assigned to each transport element, or when the transport elements are arranged, with separate clutches, at a drive shaft, and the clutches establish a connection of the transport element to the drive shaft as necessary.

It is also advantageous when the removal device is actuated when the position of the sleeve at the removal point has been detected by means of sensors. At least one sensor can be provided for this purpose, which ascertains the present or correct position of the sleeve or of the holder and forwards an appropriate signal to the controller or the drive of the transport element, in order to be able to stop the sleeve at the removal point. Thereafter, the removal device can be actuated, in order to remove the sleeve from the holder.

It is also extremely advantageous when the removal device pushes the sleeve from the holder. The sleeve does not need to be gripped in an exact manner. Instead, it is gripped at its front face and pushed along the holder out of the transport element. It is particularly advantageous for this purpose when the sleeve is held in a shell or on a sleeve mandrel. In particular, a sleeve mandrel has proven to be advantageous, which comprises a hook at its free end, with which the sleeve can be held, at least partially, at the holder and is secured against dropping out of the holder at an undesirable location.

A sleeve magazine of a textile machine according to the invention comprises a transport element. The transport element comprises a plurality of holders arranged thereon for accommodating sleeves. The transport element is driven with a drive assigned thereto. At a removal point, sleeves of the transport element can be removed from the holder. For this purpose, the transport element is guided in the sleeve magazine in such a way that the sleeve of the transport element is conveyed into the area of the removal point. A removal device is arranged at the removal point, with which the sleeves can be removed from the holder and, for example, transferred to a conveying device of the textile machine.

According to an embodiment of the invention, multiple transport elements are arranged in the sleeve magazine. Identical sleeves can be stored on each transport element. Therefore, it is possible that different types of sleeves are stored in the sleeve magazine and, as necessary, a predetermined sleeve type can be supplied to the removal point and removed from the sleeve magazine by the removal device.

The sleeve magazine therefore comprises, according to the invention, a controller, which is designed in such a way that it controls the individual transport elements in such a way that a holder of at least one of the transport elements is moved, with a sleeve, to the removal point. The removal device is actuated for removing the sleeve from the holder for the case in which the holder of the at least one transport element is located, with its sleeve, at the removal point, while the holders of the other transport elements are located outside the removal point. Therefore, a selection can be made regarding which sleeve type or how many sleeves is/are to be located at the removal point and removed from the sleeve magazine by the removal device. The removal device therefore removes sleeves, which are supplied to the removal point, from one or more of the appropriate transport element(s). Different types can therefore be stored in the sleeve magazine and, according to demand, the required sleeve can be removed alone or together with other sleeves.

It is advantageous when the removal device is designed for removing sleeves of several of the transport elements. Therefore, only one removal device, preferably for the entire sleeve magazine, is necessary. A very particularly cost-effective sleeve magazine can therefore be created.

It is also advantageous when the removal points of the transport elements are arranged adjacent to one another. The removal device can therefore be simply designed and the control of the removal device for removing the sleeves from the holders of all transport elements can be solved in a structurally simple way.

It is also advantageous when the removal device is a pushing device. With a pushing device, the sleeve can be very easily removed from the holder. The pushing device contacts the sleeve at its front face and moves it along the holder out of the transport element.

Moreover, it is advantageous when the removal device is pneumatically or electrically driven. In particular, a pneumatic drive for the removal device is particularly advantageous, since the movement can therefore also be implemented in a structurally simple way, primarily by means of a pushing device. The removal of the sleeve from the holder can also take place with an electric motor, for example, via a rotational movement of the pushing device. Both drive types are also usable, of course, when the sleeve is not removed from the holder by means of a pushing device, but rather, for example, by means of a gripper.

It is particularly advantageous when sensors are assigned to the transport elements, in order to be able to detect the position of the sleeve at the removal point by means of sensors. The sensors can either be directed to the holder and detect whether a sleeve is located at the holder or whether the holder is empty. The sensors can also detect whether a holder with a sleeve is located in the area of the removal point. The transport elements are controlled with these appropriate signals, and so only the predetermined sleeve is located in the area of the removal point and can be removed from the transport element. Generally, the other transport elements are controlled in such a way that the sensors output an appropriate signal, with which it is established that the sleeves of these other transport elements are not located in the area of the removal point. In this way, only the predetermined sleeve and not the other sleeves, which are located on the other transport elements, are removed from the sleeve magazine.

It is also advantageous when the transport elements are arranged adjacent to one another. Due to the adjacent arrangement of the transport elements, the supply as well as the removal of the sleeves is particularly easy to carry out.

It is advantageous when each transport element comprises a separate drive, for example, a separate motor. If each transport element comprises a separate drive, the activation of the transport elements is very easy to carry out. The motor of the transport element is actuated when the transport element is to move a sleeve to the removal point. Alternatively, for example, the transport elements can be coupled at a single drive shaft. The movement of the appropriate transport element is then engaged and disengaged by means of clutches.

It is also advantageous when the holders are pins for mounting or supports for the placement of sleeves. The sleeves can be very easily mounted onto the pins and also removed from the particular pin with the removal device. Preferably, the pins comprise hooks at their free ends, with which the sleeves are prevented from inadvertently dropping off the pins. If the hooks are formed on one side, it can be provided that they enable, in the area of the removal point, a smooth sliding of the sleeves over the pins, while, in other areas, they prevent the autonomous removal of the sleeves from the pins. Alternatively, the supports can be advantageous with certain sleeves, which cannot be so easily attached on pins or removed therefrom, for example, due to a pronounced beading.

It is also advantageous when the transport element is a flexible, revolving pulling means arranged transversely or longitudinally with respect to the machine alignment, in particular a chain, a cable, or a belt. With these flexible pulling means, the transport element can be guided in the sleeve magazine in a space-saving manner.

It is also advantageous when the transport element is guided in an oval or meandering manner. Due to the oval or meandering guidance of the transport element, it is possible that a large number of sleeves is stored on a small area in the sleeve magazine.

It is particularly advantageous when the sleeve magazine has a modular design and multiple transport elements are arranged next to one another, as individual modules in each case, extending in the longitudinal and/or transverse direction of the machine. Therefore, it is possible, depending on the requirements of the textile machine, that more or fewer sleeves can be stored, in that more or fewer modules with transport elements can be arranged next to one another. In particular when a large variety of sleeves is required, it is advantageous when more transport elements are arranged in the sleeve magazine. When, in another case, only a small amount of space is available to be able to set up the textile machine with its sleeve magazine, it can be advantageous to arrange few transport elements in the sleeve magazine and, herein, to be able to design the sleeve magazine to be smaller.

BRIEF DESCRIPTION OF THE DRAWINGS

Further advantages of the invention are described in the following exemplary embodiments. Wherein.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In the following description of the represented alternative exemplary embodiments, the same reference numbers are utilized for features that are identical and/or at least comparable to the other represented exemplary embodiments in terms of their design and/or mode of operation. Provided the features are not described in detail again, their design and/or mode of operation correspond/corresponds to the design and mode of operation of the above-described features.

The terms "motor" and "drive" utilized in the following can each encompass a single motor as well as a transmission connected thereto.

Figure 1:
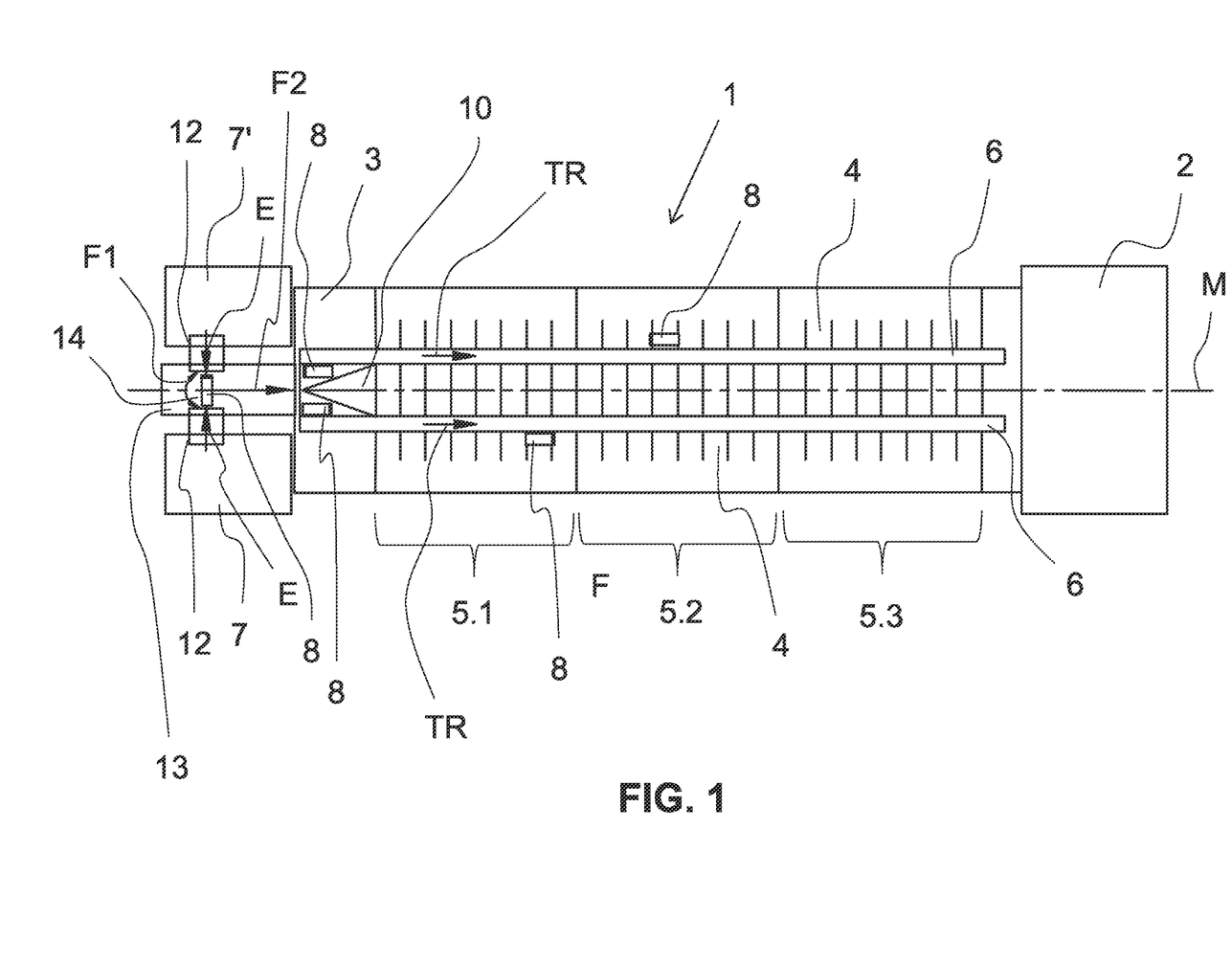
FIG. 1 shows a top view of a textile machine with multiple sleeve magazines.

In FIG. 1, a top view of a textile machine 1 represented in an outlined manner, for example, an open-end rotor spinning machine or a winder, is represented. The textile machine 1 comprises a head stock 2 and an end stock 3, which are arranged at opposite ends of the textile machine 1. The textile machine 1 has two machine sides in the longitudinal direction, at which a plurality of workstations 4 is arranged between the head stock 2 and the end stock 3. Only a few of the workstations 4 are provided with a reference number, for the sake of clarity. Depending on the type of the textile machine 1, workstations 4 can be spinning stations, for example, rotor spinning stations, air-jet spinning stations, or ring spinning stations, or winding stations of winders. The plurality of workstations 4 is grouped into sections 5.1 through 5.3. In this exemplary embodiment, eight workstations 4 are arranged in each section 5.1 through 5.3 and on each machine side. There can also be more or fewer workstations per section. In each of the workstations 4, a package arm (not represented) is provided for a sleeve 8, onto which a yarn is wound in a crosswise manner. A different sleeve type is required depending on the yarn type. This is necessary or at least helpful in order to be able to more easily identify the yarn type situated on the sleeve at a later time, when the package is no longer located at the workstation 4.

A sleeve transport device 6 is arranged along the plurality of workstations 4 at each side of the textile machine 1. In the present exemplary embodiment, the sleeve transport device 6 is designed as a conveyor belt, onto which sleeves 8 are placed and transported to a predetermined destination. The sleeves are located in a large number in two sleeve magazines 7 and 7', each of which is assigned to one machine side in this exemplary embodiment. The two sleeve magazines 7 and 7' are aligned in the machine longitudinal axis M. As a result, they are nestled closely at the textile machine 1 and, as a result, require very little installation space.

In the present exemplary embodiment, the sleeve transport device 6 has a single transport direction in the arrow direction TR. This means, the sleeves are removed from the sleeve magazines 7, 7', transferred to the particular sleeve transport device 6, and moved thereby in the arrow direction TR. Sleeve storage units can be arranged along the sleeve transport device 6, into which empty sleeves 8 can be placed and, there, wait to be taken up by the individual workstation 4. A sleeve type is requested depending on the yarn type at the relevant workstation 4.

The end stock 3 is situated between the sleeve magazines 7, 7' and the section 5.1. A transfer device 10, which moves sleeves onto the sleeve transport device 6, is located on the end stock 3. This is schematically indicated with a wedge. The transfer can take place in that the sleeves 8 are rolled or lifted by the transfer device 10 onto the sleeve transport device 6.

In order to ensure that the sleeves 8 can enter the transfer device 10, they must first be removed from the appropriate sleeve magazine 7, 7'. Removal devices 12 are provided for this purpose, which, in this exemplary embodiment, are assigned to each individual sleeve magazine 7, 7'. The sleeves 8 are moved out of the sleeve magazines 7, 7', according to the arrows E, in the direction toward the machine longitudinal axis M, between the sleeve magazines 7, 7' arranged on both sides of the machine 1 and, in the process, are removed from the sleeve magazines 7, 7' and placed onto a conveying device 13. There, they are moved to a rotating device 14. At a rotating device 14, the orientation of the sleeve 8 is corrected, as necessary, according to the arrow F1. The rotating device 14 rotates the sleeve 8 according to the desired orientation of the sleeve 8. This means, the sleeve 8 is rotated by 90° to the left or by 90° to the right, depending on whether the sleeve 8 is intended for the left side or the right side of the textile machine 1. The sleeve 8, which is now correctly oriented, is moved further, according to the arrow F2, on the conveying device 13 to the transfer device 10 and transferred to the appropriate sleeve transport device 6.

Figure 2:
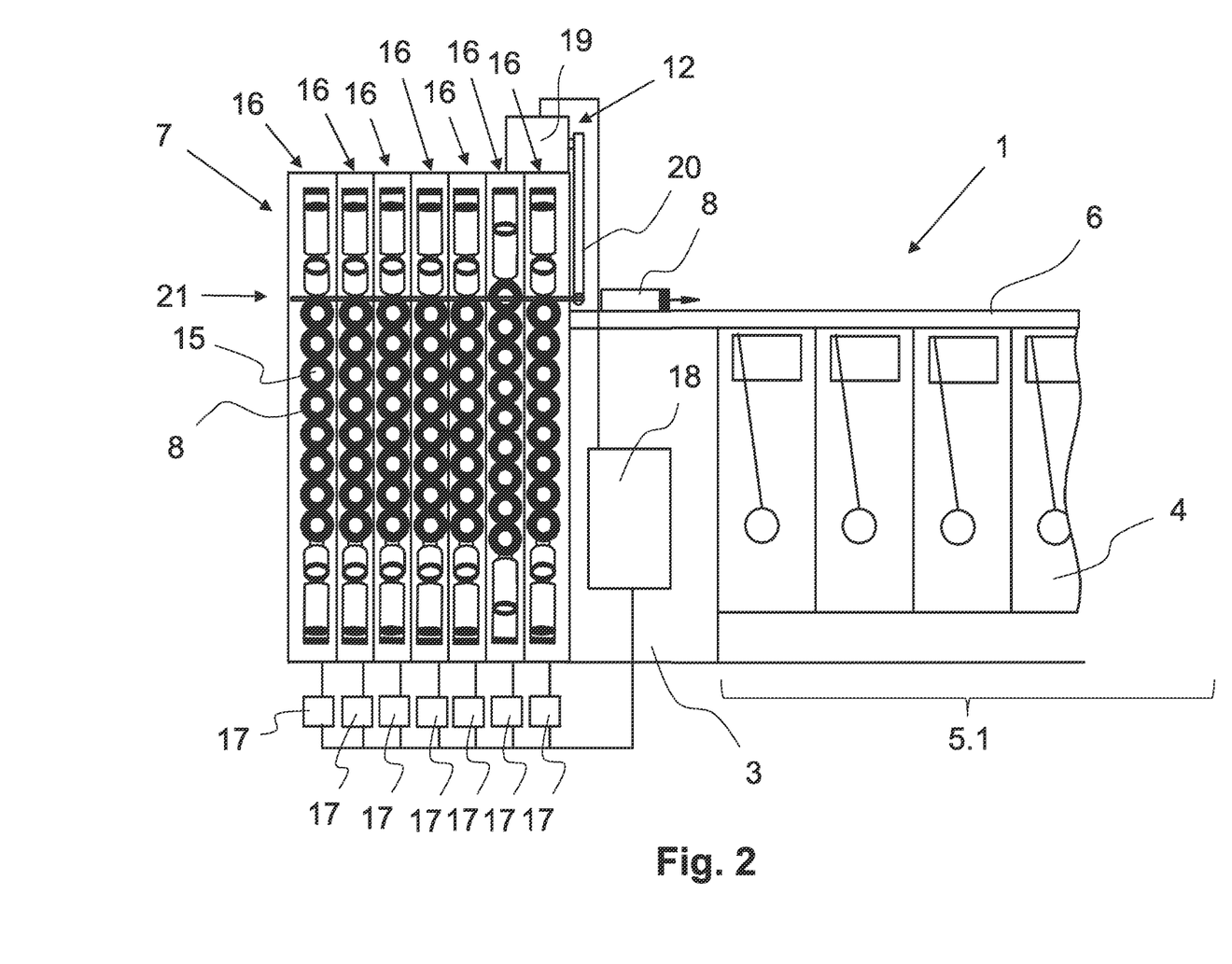
FIG. 2 shows a front view of a textile machine with one sleeve magazine.

FIG. 2 shows a section of a front view of the textile machine 1 with a sleeve magazine 7. The end stock 3 is arranged between the sleeve magazine 7 and the workstations 4. The sleeve 8 is transported with the sleeve transport device 6 from the sleeve magazine 7 to the requesting workstation 4. Seven adjacently arranged transport elements 16 are arranged in the sleeve magazine 7, each with a plurality of holders 15, on which the sleeves 8 are mounted. The transport elements 16 are arranged in an oval shape, as viewed perpendicular to the plane of the drawing. The movement of the transport elements 16 takes place independently of one another. For this purpose, a separate motor 17 or, alternatively, a clutch (not shown) of a drive shaft, is assigned to each transport element 16.

Each motor 17 or each clutch is connected to a controller 18. The controller 18 effectuates at least one of the motors 17 being set into motion, or the clutch being engaged, whereby the appropriate transport element 16 is moved and the sleeves 8 arranged thereon are transported in a revolving manner in the sleeve magazine 7. A removal device 12 is also connected to the controller 18. The removal device 12 comprises a drive 19. The drive 19 operates the pushing device 20, which is arranged in the area of a removal point 21. The removal point 21 is assigned to all transport elements 16. Each transport element 16 is capable of advancing one of its sleeves 8 to the removal point 21.

When at least one of the transport elements 16 is held, by means of the controller 18, in a position, in which a sleeve 8 is situated in the grip of the pushing device 20 at the removal point 21, the drive 19 and, herein, the pushing device 20 are actuated. Due to this actuation, the pushing device 20 pushes the sleeve 8 from its holder 15 and, herein, guides it toward the conveying device 13 (see FIG. 1). Thereafter, the sleeve 8 can be rotated and transferred to the sleeve transport device 6. Once the position of the other transport elements 16 is such that none of the sleeves 8 are situated in the engagement area of the pushing device 20, these sleeves 8 remain on their holders 15 of the particular transport elements 16. In this way, it is possible that sleeves 8 are transferred from predetermined transport elements 16 into the conveying device 13 in a targeted manner. If the individual transport elements 16 were filled with different types of sleeves 8—each transport element 16 having been filled with the same sleeve type—it is very easily possible to remove a certain type of sleeve from the sleeve magazine 7, since only the transport elements 16 need to be activated that comprise the appropriate sleeve type.

The sleeve magazine 7 has a modular design, and so more or fewer such transport elements 16 are adjacently arranged in the sleeve magazine 7 according to the demand of the textile machine 1. Once the space required in the machine longitudinal axis M is low, because the axes of the sleeves 8 are aligned transversely to the machine longitudinal axis M, the overall space required by the sleeve magazine 7 is also low and further transport elements 16 can be arranged without a considerable amount of additional space required.

Figure 3:
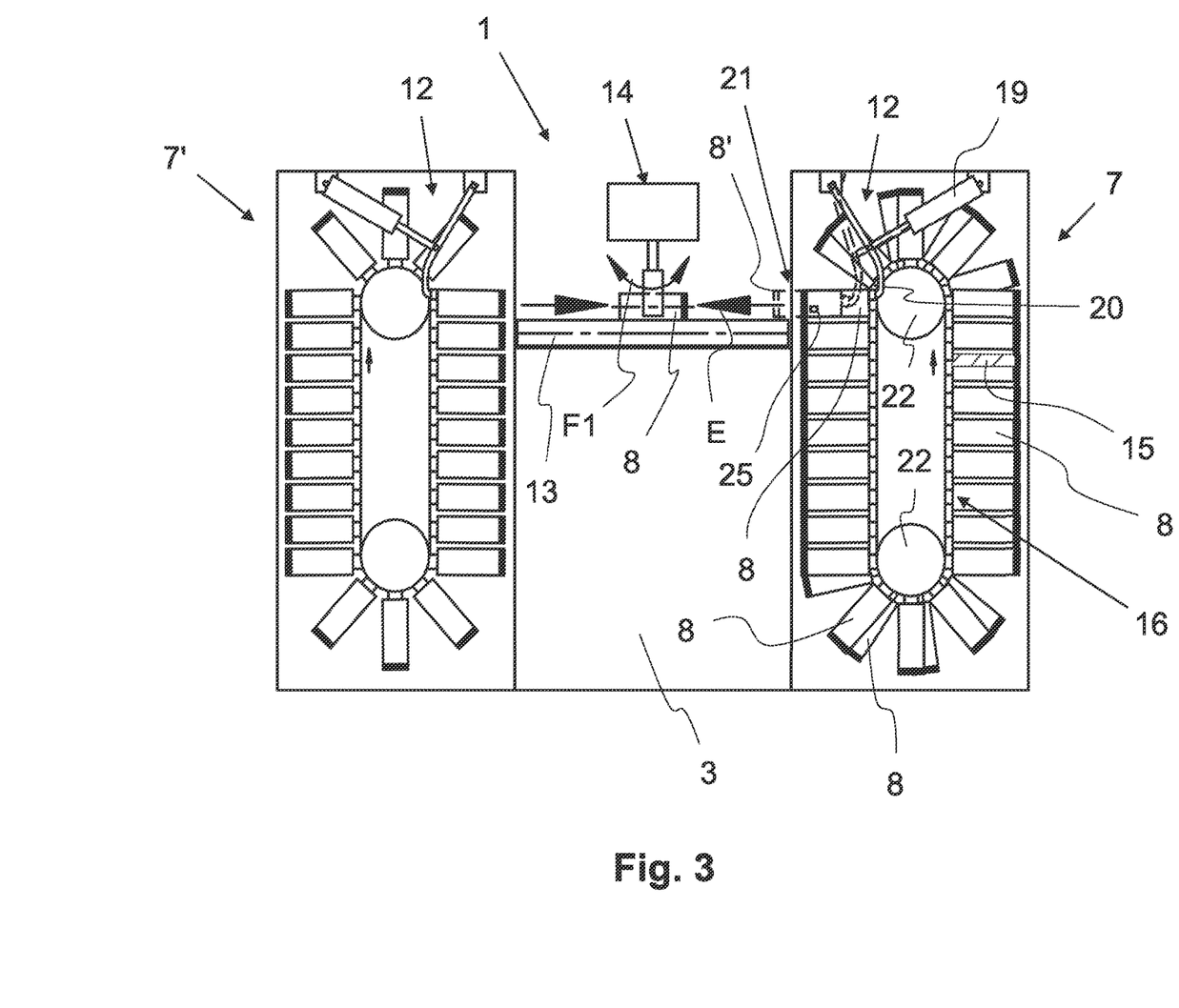
FIG. 3 shows a side view of a textile machine with multiple sleeve magazines.

In FIG. 3, a view of the front face of the textile machine 1 in the area of the end stock 3 is represented. The sleeve magazines 7 and 7' are arranged laterally with respect to the end stock 3, of which the sleeve magazine 7 is described in greater detail in the following. Each of these sleeve magazines 7 and 7' comprises holders 15 for a plurality of sleeves 8. In FIG. 3, a holder 15 is indicated with crosshatching, by way of example. The sleeves 8 are slid onto the holders 15, namely pins in this case. A plurality of the holders 15 is attached at the flexible, revolving transport element 16, which is arranged transversely to the machine longitudinal axis M and is guided via deflectors 22. The motors 17 (not represented here), which, for example, each drive one of the deflectors 22, effectuate a movement of the transport elements 16 with their holders 15 and the sleeves 8 mounted thereon. The transport elements 16 are arranged in the shape of an oval in the particular sleeve magazine 7 and 7'.

The sleeves 8 are moved past the removal device 12 and the removal point 21 or can be appropriately stopped there. When a sleeve 8 is located in the area of the removal device 12, it can be moved according to the arrow E out of the sleeve magazine 7 or 7' onto the conveying device 13. The conveying device 13 conveys the sleeve 8 into the area of the rotating device 14, in which the sleeve 8 is rotated by 90°. Therefore, the sleeve 8 is no longer aligned transversely to the machine longitudinal axis M, but rather in parallel thereto. The decision whether the sleeve 8 is rotated by 90° to the left or by 90° to the right depends on whether the sleeve 8 is required for the left machine side or for the right machine side. As is apparent in FIG. 1, the orientation of the sleeves 8 is rotated by 180°, namely on the individual machine sides.

In the exemplary embodiment represented here, the removal device 12 comprises a pneumatic drive 19, which cooperates with a rotatably mounted pushing device 20. The transport elements 16 arranged one behind the other in this representation are controlled in such a way that they are positioned offset with respect to one another by approximately one-half a sleeve diameter. As a result, it is possible, during a deflection of the pushing device 20 by the pneumatic drive 19, that only those sleeves 8 are pushed from their holder 15 that are located in the grip of the pushing device 20. Other sleeves 8, from other transport elements 16 of the sleeve magazine 7, which are positioned offset with respect to one another by approximately one-half a sleeve diameter for this purpose, are not reached by the pushing device 20 and, therefore, remain on their holder 15. In this way, it can be determined, in a targeted manner, by the controller 18, from which transport elements 16 sleeves 8 are to be removed. The transport element 16 from which a sleeve 8 is to be removed is therefore stopped in such a way that a sleeve 8 is located in the grip of the pushing device 20, while the transport elements 16, the sleeves 8 of which are to remain on their holders 15, are stopped in such a way that their sleeves 8 do not enter into the grip of the pushing device 20. When the pushing device 20 can simultaneously reach all or at least several of the transport elements 16, the movement of the removal device 12 during a removal of a sleeve 8 from the sleeve magazine 7 is always the same. Only the positioning of the transport elements 16 determines which sleeve 8 is removed from the sleeve magazine 7.

In order to establish whether a sleeve 8 is in a suitable position in the area of the removal point 21 for the removal from the sleeve magazine 7, a sensor 25 can be provided, which detects whether a sleeve 8 is present at the removal point 21. The sensor 25 outputs an appropriate signal to the controller 18, whereby the controller 18 recognizes that either a sleeve 8 of an undesired transport element 16 is present at the removal point 21 and, therefore, this transport element 16 must be driven a bit further, or it is detected that an empty holder 15 is located at the removal point 21, whereby the relevant transport element 16 must also be driven further. The relevant transport element 16 remains at a standstill only if the sensor 25 establishes that the desired transport element 16 at the removal point 21 has a sleeve 8. The sleeve 8 can then be removed.

Figure 4A:
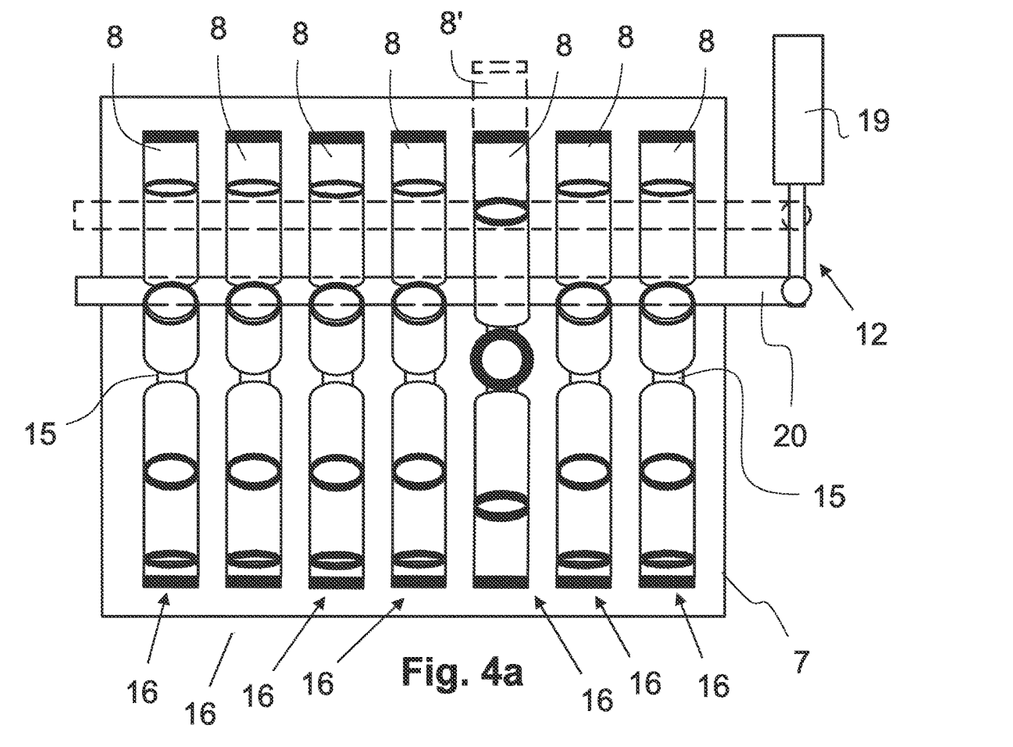
FIG. 4a shows a top view of a sleeve magazine during the removal of a sleeve.

FIG. 4a shows a top view of the sleeve magazine 7 from FIG. 3 during the removal of a sleeve 8. Seven transport elements 16 are arranged next to one another in the sleeve magazine 7. A plurality of sleeves 8 is attached at holders 15 at each of the transport elements 16. The removal device 12 shows the pneumatic drive 19. The pushing device 20 is arranged at the pneumatic drive 19. The third transport element 16 from the right, in contrast to the remaining transport elements 16, is stopped so as to be offset with respect to the remaining transport elements 16 by approximately one-half a sleeve diameter. As a result, the pushing device 20, when it is set into motion by the drive 19, can grip one of the sleeves 8 and push it from the holder 15. This is represented by the dashed-line representation of the pushing device 20 and the removed sleeve 8'. Due to an appropriate movement of the transport elements 16 and the stopping of the transport element 16, the sleeves 8 of which are to be removed, the removal of predetermined sleeves 8 from the sleeve magazine 7 can take place in a targeted manner.

Figure 4B:
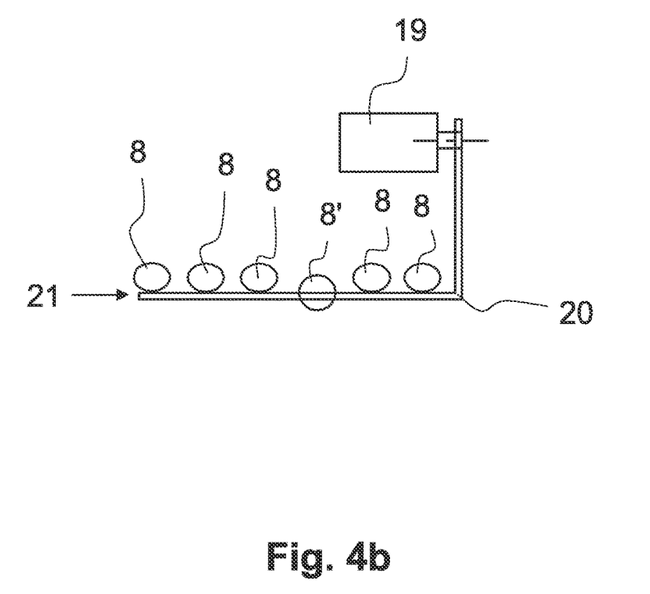
FIG. 4b shows a schematic front view of a removal point of a sleeve magazine during the removal of a sleeve.

FIG. 4b shows, corresponding to FIG. 4a, a schematic front view of a removal point 21 of the sleeve magazine 7 during the removal of a sleeve 8'. This schematic representation is intended to better illustrate the mode of operation. As is apparent, only one single sleeve 8' is in the entry area of the pushing device 20 at the removal point 21. The drive 19 swivels the pushing device 20 in this case. Only the sleeve 8' is situated in the swivel movement of the pushing device 20; the sleeve 8' was stopped so as to be offset with respect to the remaining sleeves 8 by approximately one-half a sleeve diameter. As a result, only the sleeve 8' is transported out of the sleeve magazine 7.

Figure 5:
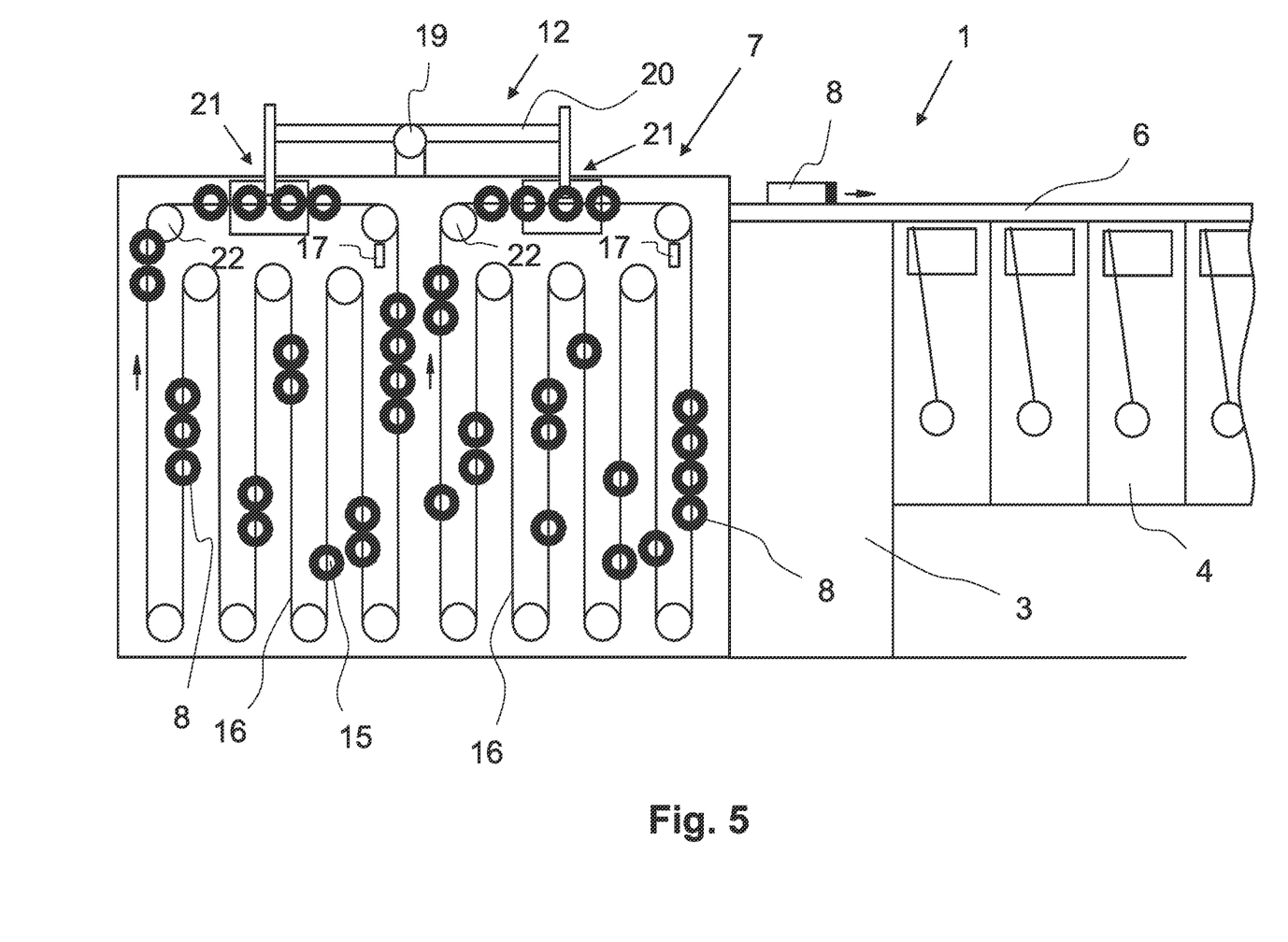
FIG. 5 shows a front view of a textile machine with an alternative sleeve magazine.

FIG. 5 shows a front view of a textile machine 1 with an alternative sleeve magazine 7. The representation is similar to the embodiment according to FIG. 2. A partial side view of the textile machine 1 is also apparent here. A sleeve magazine 7, in which two transport elements 16 are present, is arranged following the end stock 3. Each transport element 16 forms a module, is arranged along the machine longitudinal axis M, and is deflected multiple times, in a meandering manner, with deflectors 22. Therefore, a space-saving configuration for the magazining of the sleeves 8 is created. Each of the transport elements 16 is driven with a motor 17 in such a way that it is movable in one direction (see arrow direction) or also in both directions. A removal device 12 is provided for removing a sleeve 8 from the transport element 16 or a holder 15 arranged thereon or from a storage tray, in which the sleeve 8 is situated. The sleeve 8 is removed from the holder 15 of the transport element 16 by means of the removal device 12 and supplied to the sleeve transport device 6. The removal of the sleeve 8 from the holder 15 of the transport element 16 takes place in such a way that the removal device 12 removes the sleeve 8 from the holder 15 with the aid of the pushing device 20 and moves it toward the sleeve transport device 6. This can take place directly—as is also the case in the other exemplary embodiments—or other devices, as described above, can be implemented therebetween. The removal of the sleeve 8 from the holder 15 takes place according to the same principle as described above. In this case as well, the transport element 16, from which a sleeve 8 is to be removed, is stopped so as to be offset with respect to the other transport element 16 by approximately one-half a sleeve diameter. As a result, only one sleeve 8 enters the engagement area of the pushing device 20. Upon an actuation of the drive 19, the pushing device 20 moves and pushes only the sleeve 8 from its holder 15 that is in the grip of the pushing device 20. In this case as well, therefore, a certain sleeve 8 can be removed from the sleeve magazine 7 in a targeted manner with a simple removal device 12 and an appropriate control of the motors 17 of the transport device 16.

Due to the utilization of two transport elements 16, a presorting of different sleeve types can already take place. Therefore, a certain sleeve type can be magazined on each transport element 16. It is therefore very easy for the operating personnel to determine which sleeve type in the magazine 7 or in the particular transport element 16 is to be refilled. In addition, when a certain sleeve type is requested, it is very easily possible for the controller of the textile machine 1 to activate the appropriate transport element 16 and remove the sleeve 8 therefrom.

The present invention is not limited to the represented and described exemplary embodiments. Modifications within the scope of the claims are also possible, as is any combination of the features, even if they are represented and described in different exemplary embodiments.

LIST OF REFERENCE NUMBERS 1 textile machine
2 head stock
3 end stock
4 workstation
5 section
6 sleeve transport device
7 sleeve magazine
8 sleeves
10 transfer device
12 removal device
13 conveying device
14 rotating device
15 holder
16 transport element
17 motor
18 controller
19 drive
20 pushing device
21 removal point
22 deflector
25 sensor
M machine longitudinal axis
TR transport direction
E removal direction
F1 direction of rotation
F2 conveyance direction

The invention claimed is:

1. A method for removing individual sleeves from a sleeve magazine of a textile machine, wherein the sleeve magazine further includes multiple transport elements each with a plurality of holders configured for holding a sleeve, wherein the transport elements are driven to move the holders and sleeves to an individual respective removal point associated with each of the transport elements, and wherein a removal device is arranged so as to extend across all of the removal points to remove the sleeves from the holders that are located at the individual respective removal point for each of the transport elements, the method comprising:
  with a controller, controlling movement of the individual transport elements such that the holder of at least a first transport element is moved with the sleeve thereon to the individual respective removal point associated with the first transport element; and
  with the controller, actuating the removal device and removing the sleeve from the holder at the individual respective removal point associated with the first transport element while holders of the remaining transport elements are maintained outside of the individual respective removal point associated with each of the remaining transport elements so as not to interfere with removal of the sleeve from the holder at the individual respective removal point of the first transport element.

2. The method of claim 1, wherein the removal device is controlled to remove a plurality of the sleeves at the individual respective removal point from the holders of a plurality of the transport elements.

3. The method of claim 1. wherein the transport elements are individually activated to move the one of the holders thereon to the individual respective removal point of the transport element while remaining ones of the transport elements are stationary.

4. The method of claim 1, wherein the removal device is actuated upon detecting a position of the sleeve at the individual respective removal point of the first transport element with a sensor.

5. The method of claim 1, wherein the removal device is configured and controlled to push the sleeve from the holder at the individual respective removal point of the first transport element.

6. A sleeve magazine for a textile machine, comprising:
a plurality of adjacently disposed transport elements, wherein each transport element comprises a plurality of holders arranged thereon for receipt of respective sleeves;
a motor configured to drive the transport elements in a path such that the holders are moved to a removal point for removal of the sleeves therefrom, wherein each transport element has an individual respective removal point associated therewith;
a removal device operably arranged at the removal point so as to extend across all of the removal points:
a controller in communication with the transport elements and the removal device, the controller configured to:
control the individual transport elements such that the holder with the sleeve thereon of at least a first transport element is moved to the removal point associated with the first transport element; and
actuate the removal device to remove the sleeve from the holder at the removal point associated with the first transport element while maintaining the holders of the other transport elements outside of the respective removal point of the other transport elements.

7. The sleeve magazine of claim 6, wherein the removal device is configured to remove a plurality of the sleeves from the holders of a plurality of the transport elements at the individual respective removal point of the plurality of transport elements.

8. The sleeve magazine of claim 6, wherein the individual respective removal point for the transport elements are also adjacent to each other.

9. The sleeve magazine of claim 6, wherein the removal device comprises a pusher element that engages and pushes the sleeve from the holder at the individual respective removal point associated with the first transport element.

10. The sleeve magazine of claim 6, wherein the removal device is pneumatically or electrically driven.

11. The sleeve magazine of claim 6, further comprising a sensor in communication with the controller and disposed to detect a position of the sleeve at the removal point associated with first transport element.

12. The sleeve magazine of claim 6, further comprising a separate motor or a separate clutch configured to each transport element.

13. The sleeve magazine of claim 6, wherein the holders comprise pins or supports on which the sleeves are placed.

14. The sleeve magazine of claim 6, wherein the transport elements comprise a flexible member driven in a revolving path and arranged transversely or longitudinally with respect to a longitudinal axis of the textile machine.

15. The sleeve magazine of claim 14, wherein the revolving path is an oval path or a multiple-deflection meandering path.

16. The sleeve magazine of claim 6, wherein the transport elements are modular, each module arranged adjacent to one another transversely or longitudinally with respect to a longitudinal axis of the textile machine.

* * * * *